UNITED STATES PATENT OFFICE.

HENRY R. NELSON, OF WALNUT GROVE, MINNESOTA.

WEEDING ATTACHMENT FOR CORN-CULTIVATORS.

No. 839,308.  Specification of Letters Patent.  Patented Dec. 25, 1906.

Application filed May 31, 1905. Serial No. 263,042.

*To all whom it may concern:*

Be it known that I, HENRY R. NELSON, of Walnut Grove, Redwood county, Minnesota, have invented certain new and useful Improvements in Weeding Attachments for Corn-Cultivators, of which the following is a specification.

In cultivating corn it is customary to work between the rows with the teeth of the cultivator as near the hills of corn as possible without plowing out or covering up the cornplants. The operation of the cultivator leaves a row of weeds between the hills of corn and among the plants, and it is impossible to reach these weeds with the teeth of an ordinary cultivator.

The object, therefore, of my invention is to provide a device capable of attachment to any ordinary corn-cultivator and adapted to pull or tear up the weeds and level the soil around the corn-plants and break up the lumps or clods of earth without in any way injuring the corn.

My invention consists generally in a frame adapted to be secured to the frame of a cultivator and provided with a series of flexible teeth which rake over the surface of the ground and the corn-hills.

Further, the invention consists in arranging these flexible teeth substantially in the form of a letter A, so that the soil and the lumps or clods of earth broken up by the teeth will be thrown out to the side of the hills and have the effect of leveling the ridges left by the teeth of the cultivator.

Figure 1:
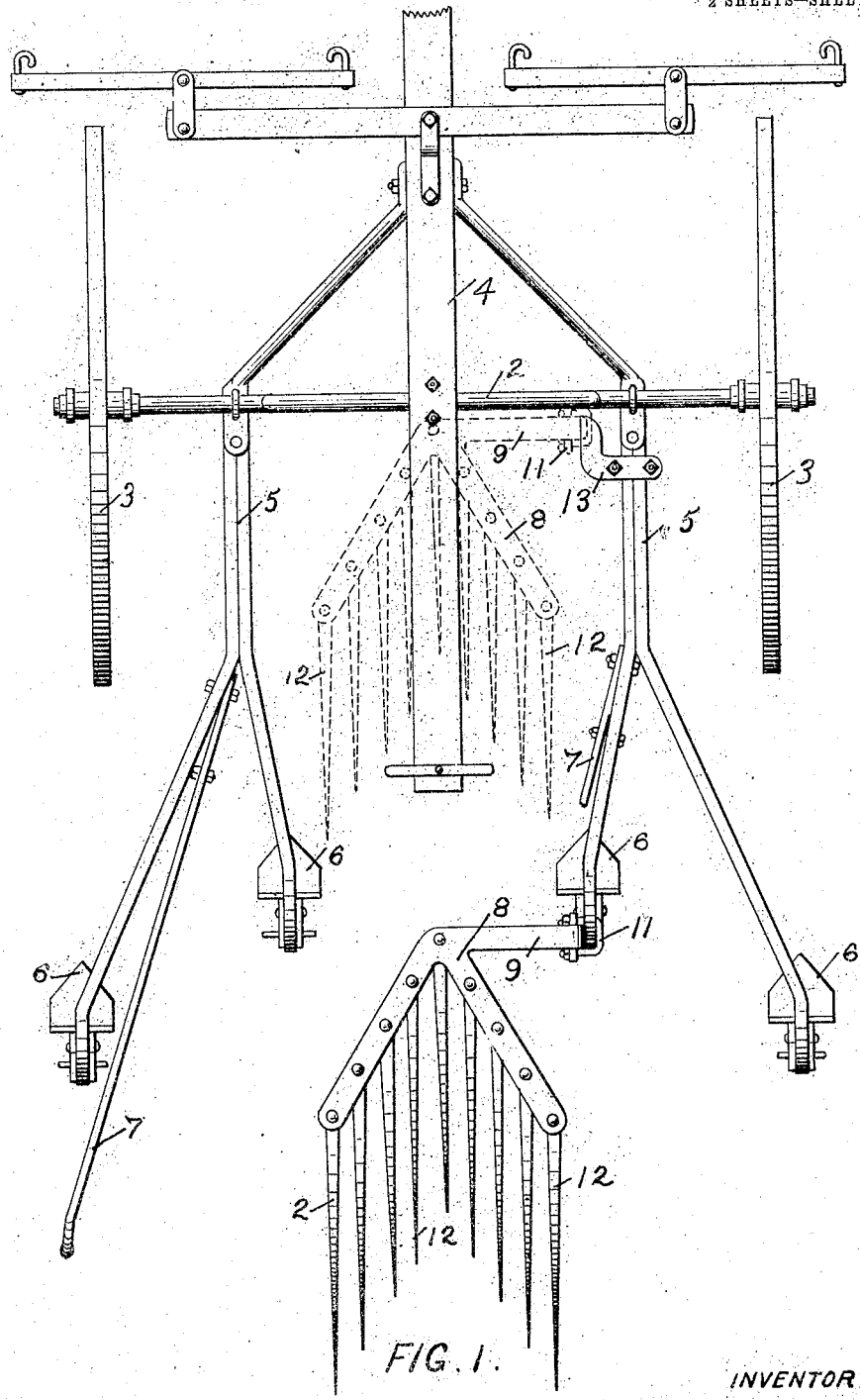
Figure 2:
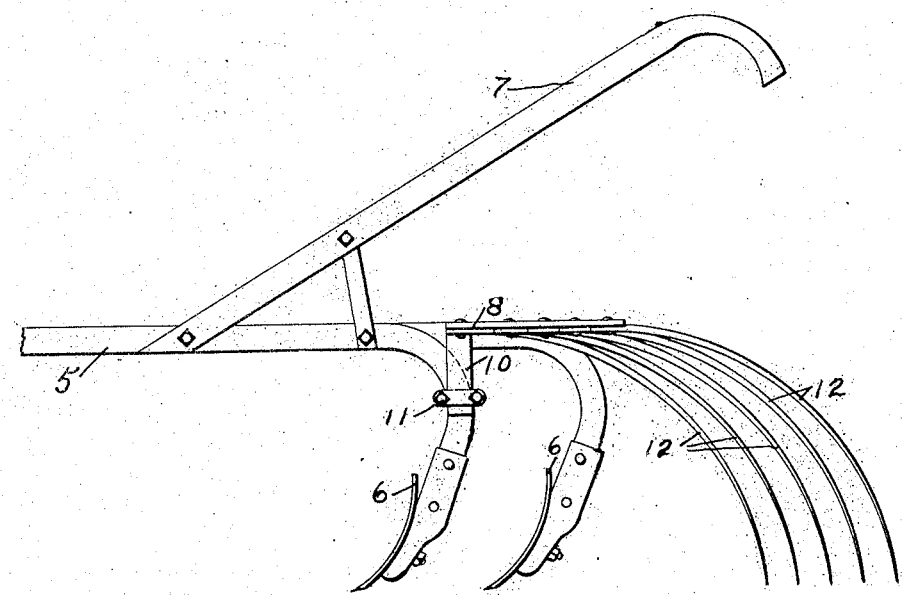
Figure 3:
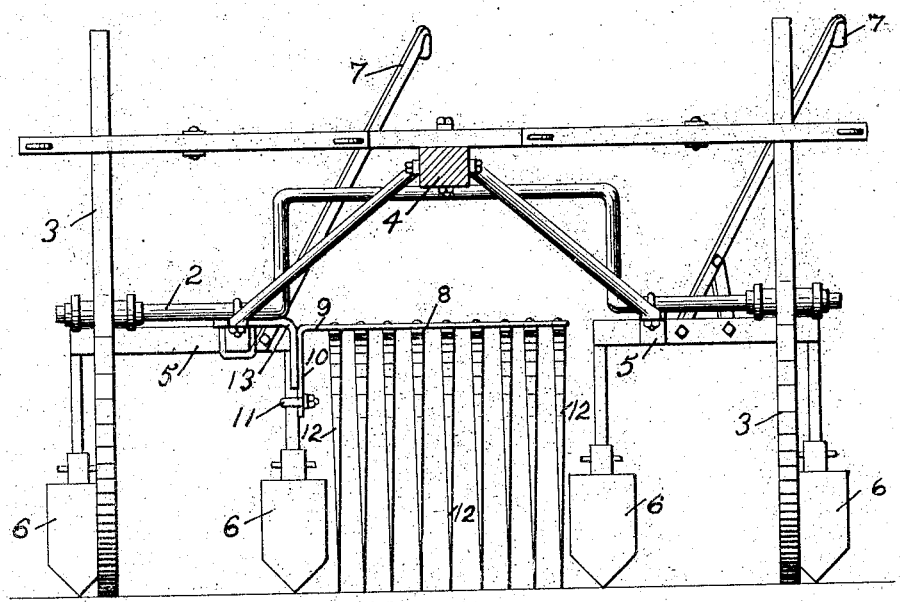

In the accompanying drawings, forming part of this specification, Figure 1 is a plan view of a corn-cultivator with my invention applied thereto. Fig. 2 is a side elevation of the rear portion of the cultivator and attachment. Fig. 3 is a transverse sectional view of the cultivator, showing the position of the weeding attachment thereon between the cultivator-teeth.

In the drawings, 2 represents the axle of the cultivator, having wheels 3 and draft-pole or tongue 4.

5 represents drag-bars forked at their rear ends and provided with the usual cultivator-teeth 6 and with the rearwardly-extending handles 7, one of which is broken off to allow the weeding attachment beneath to be seen more clearly. I have shown the invention attached to an ordinary weeding-cultivator; but obviously it can be applied to one with a riding attachment as well.

8 represents an A-shaped frame having a right-angle extension or arm 9 at its apex, provided with a depending end 10, which is clamped on the drag-bar 5 by a suitable clamp 11. The clamp may be adjusted vertically on the drag-bar to regulate the distance of the frame 8 from the ground. A series of flexible teeth 12 are mounted in the frame 8 and have pointed lower ends and are slightly curved, as shown in Fig. 2, and are adapted to drag over the ground and over the corn-hills and pull and tear out the weeds that are shallow-rooted without disturbing the deeper-rooted and tougher corn-plants. The teeth are arranged as indicated in Fig. 1, in substantially an A-shaped form, and as they pass over the hills of corn they will have a tendency to spread out the loose soil which is thrown up by the cultivator-teeth and also break up any clods or lumps of earth which may be in or between the hills and which cannot be reached by cultivator-teeth.

I prefer to make the teeth curved and flexible to avoid any danger of injury to the corn-plants, and I also prefer to arrange the teeth in the form of the letter A with a single tooth at the apex, so that when refuse material or clods of dirt strike the forward tooth they will slip to one side and pass from tooth to tooth, being directed thereby away from the hills and the plants. If the teeth were arranged in a straight row at right angles to the direction of travel, the refuse and clods of dirt would be dragged over the hills and destroy or seriously damage the plants. This objection to a weeding attachment I have entirely avoided by arranging the teeth in the manner shown.

In Fig. 1 I have shown a bracket 13 secured to one of the drag-bars in front of the cultivator-teeth, and to this bracket the weeder attachment may be secured in the same manner as to the drag-bar in the rear of the cultivator-teeth. When the weeder attachment is mounted on the bracket 13, it will operate in front of the cultivator-teeth instead of behind them. Its functions, however, will be substantially the same in either position. With this device applied to a cultivator I am able to do the work which usually requires two machines to accomplish, and by going over the field once I am able to cultivate the corn and remove the weeds from around the hills and level off the ridges, and thereby effect a great saving in time and labor over the usual method of running a cultivator through the corn and then going over the field with a machine to remove the weeds from the hills.

I do not wish to confine myself to any particular size or style of cultivator with which to use my attachment, nor to the particular manner of supporting the attachment to the cultivator, my invention consisting in the combination of the weeding attachment with the cultivator to perform the cultivating and weeding operation simultaneously.

I claim as my invention—

A cultivator comprising an axle having carrying-wheels and drag-bars extending rearwardly therefrom and plows carried by said bars and arranged to operate between them on each side of a row of plants, the inner plows on opposite sides of the machine being spaced apart to straddle a row of plants, in combination with a frame having a rigid attachment to one of said bars and vertically movable therewith and of substantially the width of the space between said inner plows, and a series of spring-teeth mounted on said frame and rearwardly and downwardly curved therefrom and having lower ends to contact with the soil to break up the clods and remove the weeds without disturbing the plants.

In witness whereof I have hereunto set my hand this 26th day of May, 1905.

HENRY R. NELSON.

Witnesses:
ANDREW ANDERSON,
H. O. GARLOCK.